United States Patent [19]

Hari et al.

[11] 4,400,319
[45] Aug. 23, 1983

[54] MONOAZO PIGMENTS CONTAINING HETEROCYCLES, AND HIGH-MOLECULAR ORGANIC MATERIALS DYED THEREWITH

[75] Inventors: Stefan Hari, Allschwil; Arnold Wick, Therwil, both of Switzerland

[73] Assignee: Ciba-Geigy Corporation, Ardsley, N.Y.

[21] Appl. No.: 305,305

[22] Filed: Sep. 24, 1981

[30] Foreign Application Priority Data

Oct. 3, 1980 [CH] Switzerland ............... 7401/80

[51] Int. Cl.³ .................. C09B 29/34; C09B 29/32
[52] U.S. Cl. ......................... 260/155; 260/158
[58] Field of Search ..................... 260/155, 158

[56] References Cited

U.S. PATENT DOCUMENTS

| | | | |
|---|---|---|---|
| 2,093,214 | 9/1937 | Schrader et al. | |
| 3,644,405 | 2/1972 | Horstmann et al. | 260/156 |
| 4,001,206 | 1/1977 | Schoefberger | 260/158 |
| 4,118,382 | 10/1978 | Jäger et al. | 260/158 X |
| 4,229,343 | 10/1980 | Sunge et al. | 260/155 X |
| 4,234,480 | 11/1980 | Krämer | 260/158 X |
| 4,265,812 | 5/1981 | Weaver et al. | 260/155 X |

OTHER PUBLICATIONS

CA, 31, 8216′ (1937).
CA, 71, 22900m (1969).

*Primary Examiner*—Paul F. Shaver
*Attorney, Agent, or Firm*—Luther A. R. Hall

[57] ABSTRACT

Compounds of the formula I

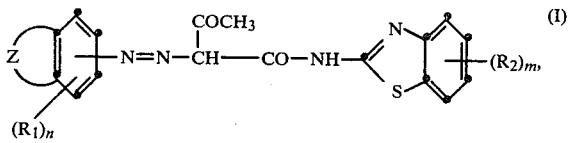

wherein the symbols Z, $R_1$, $R_2$, m and n have the meanings defined in claim 1, are suitable, as high-grade pigments, for dyeing high-molecular organic material. They are characterized in particular by good fastness to migration and to cross-lacquering, as well as to weather and light.

10 Claims, No Drawings

MONOAZO PIGMENTS CONTAINING HETEROCYCLES, AND HIGH-MOLECULAR ORGANIC MATERIALS DYED THEREWITH

The present invention relates to novel monoazo pigments containing heterocycles, to processes for producing the pigments, and to the use thereof for dyeing high-molecular organic materials, as well as to the high-molecular organic material dyed with these pigments.

In the G.B. Patent Specification No. 1,188,766 are mentioned azo pigments which are obtained by the coupling of a diazotised, N-substituted aminophthalimide with, inter alia, 2-acetoacetylamino-6-ethoxybenzothiazole. And there are described in the French Patent Specification No. 769,922 and in the Japanese Published Specification No. 69/3230 azo pigments which are obtained by coupling diazotised substituted aminobenzenes with 2-acetoacetylamino-6-ethoxybenzothiazole.

The novel monoazo pigments of the present invention correspond to the formula I

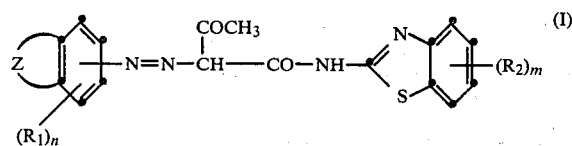

wherein $R_1$ is hydrogen, methyl, chlorine, methoxy, ethoxy, phenoxy or $C_2$-$C_5$-alkoxycarbonyl, and $R_2$ is methyl, chlorine, fluorine, bromine, $C_1$-$C_4$-alkoxy, phenoxy, methoxycarbonyl, ethoxycarbonyl, carbamoyl, nitro or a group —NHCO—$R_3$, in which $R_3$ is a $C_1$-$C_3$-alkyl group, Z together with the two carbon atoms to which it is bound forms a 5- or 6-membered heterocyclic ring, where Z is a bivalent radical of the formula —CONHCO—, —CONHCONH—, —CONHCR$_5$=N—, —NHCONR$_4$—, —NHCOCONH—, —NR$_4$COO—, —NR$_4$COS—, —N=CR$_6$O— —N=CR$_6$S—, —N=CR$_6$NH—, NHCOCH=CR$_4$— or —NHCOCH$_2$O—, in which $R_4$ is hydrogen, $C_1$-$C_4$-alkyl or phenyl which is unsubstituted or substituted by halogen, $C_1$-$C_4$-alkyl or $C_1$-$C_4$-alkoxy, and $R_5$ is hydrogen or a group

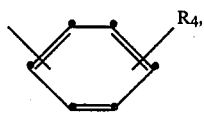

where $R_4$ has the meaning defined above, and $R_6$ is hydrogen, methyl or phenyl, n is 1 or 2, and m is 1, 2 or 3.

When n is 2 and/or m is 2 or 3, and $R_1$ and $R_2$ can be identical or different radicals as defined. If n is 2, one $R_1$ has the meaning given above and the second $R_1$ is preferably hydrogen or chlorine. Where m is 2 or 3, one $R_2$ has the meaning defined under the formula I, the second $R_2$ is preferably methyl, chlorine, methoxy or ethoxy, and the third $R_2$ is in particular methyl.

As $C_2$-$_5$-alkoxycarbonyl, $R_1$ can be for example: methoxycarbonyl, ethoxycarbonyl, isopropyloxycarbonyl, n-butyloxycarbonyl or sec-butyloxycarbonyl. Methoxycarbonyl and ethoxycarbonyl are preferred.

Alkoxy groups $R_2$, alkyl groups $R_4$ and alkyl or alkoxy substituents on $R_4$ groups can be straight-chain or branched-chain; they are however preferably straight-chain. Examples of such groups or substituents are: methyl, ethyl, n-propyl, isopropyl, n-butyl, sec-butyl, methoxy, ethoxy, n-propyloxy, isopropyloxy, n-butyloxy and sec-butyloxy.

When $R_3$ is a $C_{1-3}$-alkyl group, it is for example methyl, ethyl or isopropyl.

Of particular interest are compounds of the formula I wherein $R_1$ and $R_2$ have the meanings defined above, and Z is a group —NHCOCH=CR$_4$—, with $R_4$ being hydrogen and especially methyl, or a group —CONHCO— and in particular a group —NHCONR$_4$—, wherein $R_4$ has the meaning defined above and is especially hydrogen.

The preferred meaning of n and m is 1.

Particularly preferred are compounds of the formula II

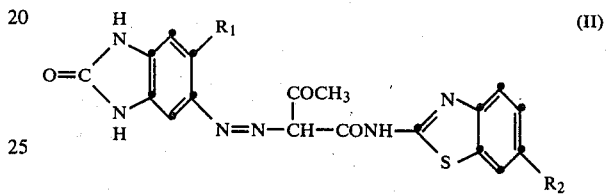

wherein $R_1$ is methyl, chlorine or methoxy, and $R_2$ is methyl, chlorine, straight-chain $C_1$-$C_4$-alkoxy, methoxycarbonyl, ethoxycarbonyl, carbamoyl, —NO$_2$ or a group —NHCOR$_3$, in which $R_3$ is a $C_{1-3}$-alkyl group, especially compounds of the formula II wherein $R_1$ is methyl, chlorine or methoxy, and $R_2$ is methyl, chlorine, straight-chain $C_{1-4}$-alkoxy or a group —NHCOR$_3$.

The compounds of the formula I are produced using known methods, for example by the coupling of a diazonium salt of an amine of the formula III

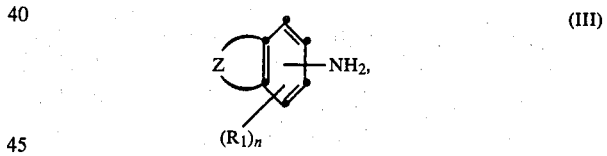

wherein Z, $R_1$ and n have the meanings defined above, with an acetoacetylamide of the formula IV

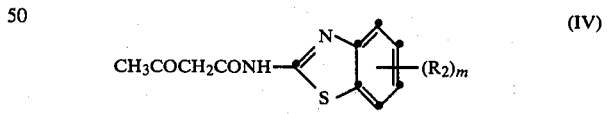

wherein $R_2$ and m have the meanings defined above.

The compounds of the formulae III and IV are known and can be produced by known methods.

The following may be mentioned as examples of amines of thhe formula III: 5-amino-6-chlorobenzimidazolone, 5-amino-6-methyl-benzimidazolone, 5-amino-6-methoxy-benzimidazolone, 5-amino-6-ethoxy-benzimidazolone, 5-amino-6-methoxycarbonyl-benzimidazolone, 5-amino-6-ethoxycarbonyl-benzimidazolone, 6-amino-5-methylbenzoxazolone, 7-amino-4,6-dimethylquinol-2-one, 6-amino-7-chloro-4-methyl-quinol-2-one, 7-amino-6-chlorophenylmorphol-3-one, 7-amino-6-methyl-phenylmorphol-3-one, 6-amino-2,3- dihydroxyquinoxaline, 4-aminophthalimide and 3-aminophthalimide.

The coupling components according to formula IV may be illustrated by the following examples: 2-acetoacetylamino-6-methyl-benzothiazole, 2-acetoacetylamino-6-chlorobenzothiazole, 2-acetoacetylamino-6-methoxy-benzothiazole, 2-acetoacetylamino-6-ethoxy-benzothiazole, 2-acetoacetylamino-6-methoxycarbonyl-benzothiazole, 2-acetoacetylamino-6-methoxycarbonyl-benzothiazole, 2-acetoacetylamino-6-carbamoyl-benzothiazole, 2-acetoacetylamino-4-methyl-benzothiazole, 2-acetoacetylamino-5-methyl-benzothiazole, 2-acetoacetylamino-7-methyl-benzothiazole, 2-acetoacetylamino-4-chlorobenzothiazole, 2-acetoacetylamino-5-chlorobenzothiazole, 2-acetoacetylamino-7-chlorobenzothiazole, 2-acetoacetylamino-5,6-dimethyl-benzothiazole, 2-acetoacetylamino-3,6-dimethyl-benzothiazole, 2-acetoacetylamino-4-methyl-6-chlorobenzothiazole, 2-acetoacetylamino-4-chloro-6-methyl-benzothiazole, 2-acetoacetylamino-6-acetylamino-benzothiazole, 2-acetoacetylamino-5-chloro-6-methyl-4-methoxybenzothiazole, 2-acetoacetylamino-4,6,7-trimethylbenzothiazole, 2-acetoacetylamino-4,6-dichlorobenzothiazole, 2-acetoacetylamino-6-n-butoxybenzothiazole, 2-acetoacetylamino-6-nitrobenzothiazole, 2-acetoacetylamino-6-phenoxybenzothiazole, 2-acetoacetylamino-6-fluorobenzothiazole.

Diazotisation is performed by known methods. The coupling occurs preferably in a slightly acid medium, advantageously in the presence of customary agents which promote coupling. There may be mentioned as such in particular dispersing agents, for example aralkylsulfonates, such as dodecylbenzenesulfonate, or 1,1'-dinaphthylmethane-2,2'-disulfonic acid or polycondensation products of alkylene oxides. The dispersion of the coupling components can advantageously contain protective colloids, for example methyl cellulose, or smallish amounts of inert organic solvents difficultly soluble or insoluble in water, for example optionally halogenated or nitrated aromatic hydrocarbons, such as benzene, toluene, xylene, chlorobenzene, dichlorobenzene or nitrobenzene, as well as aliphatic halogenated hydrocarbons, for example carbon tetrachloride or trichloroethylene, also organic solvents miscible with water, such as acetone, methyl ethyl ketone, methanol, ethanol or isopropanol, or preferably dimethylformamide.

The coupling can be advantageously performed also by continuously combining in a mixing nozzle an acid solution of the diazonium salt with an alkaline solution of the coupling component, in the process of which an immediate coupling of the components occurs. It is to be ensured that diazo component and coupling component are present in equimolecular amounts in the mixing nozzle, the use of a slight excess of diazo component providing advantageous. This is achieved most simply by checking the pH-value of the liquid in the mixing nozzle. There is to be provided also a vigorous turbulence of the two solutions in the mixing nozzle. The formed dye dispersion is continuously taken from the mixing nozzle, and the dye is separated by filtration.

Finally, coupling can be effected also by suspending the amine with the coupling component, in the molar ratio of 1:1, in an organic solvent, and treating the suspension with a diiazotising agent, especially with an ester of nitrous acid, such as methyl, ethyl, butyl, amyl or octyl nitrite, or alternatively with an aqueous sodium nitrite solution.

The pigments according to the invention can be used for example as crude products. If required, however, the crude products can be converted into a finely divided form by grinding or kneading. It is advantageous to use for this purpose grinding auxiliaries, such as inorganic and/or organic salts in the presence or absence of organic solvents. The grinding auxiliaries are removed in the customary manner after grinding, soluble inorganic salts being removed for example with water, and water-insoluble organic auxiliaries for example by steam distillation. An improvement of properties can often be achieved also, if desired, by treatment of the crude pigments with organic solvents, preferable those boiling above 100° C. Particularly suitable are benzenes substituted by halogen atoms, or by alkyl or nitro groups, such as xylenes, chlorobenzene, o-dichlorobenzene or nitrobenzene; as well as pyridine bases, such as pyridine, picoline or quinoline; also ketones, such as cyclohexanone; ethers, such as ethylene glycol monomethyl or -monoethyl ether; amides, such as dimethylformamide or N-methyl-pyrrolidone; and also dimethyl sulfoxide or sulfolane, or water alone, in all cases optionally under pressure. It is also possible to perform the aftertreatment in water, in the presence of organic solvents, and/or with the addition of surface-active substances.

The aftertreatment is carried out preferably by heating the pigment in water or solvent to 100° to 200° C., during which there occurs in certain cases a coarsening of the particle size and possibly a crystal modification transformation, which has a favourable effect on the fastness to light and migration properties of the pigments obtained.

The pigments according to the invention are suitable for dyeing high-molecular organic material of natural or synthetic origin. They can be for example natural resins, drying oils or rubber; or they can be modified natural substances, for example chlorinated rubber, oil-modified alkyd resins, viscose or cellulose derivatives, such as acetylcellulose and nitrocellulose, and particularly fully-synthetic organic polyplasts, that is, plastics which are produced by polymerisation, polycondensation and polyaddition. The following in particular may be mentioned from this class of plastics: polyethylene, polypropylene, polyisobutylene, polystyrene, polyvinyl chloride, polyvinyl acetate, polyacrylonitrile, polyacrylate and polymethacrylate; polyesters, especially high-molecular esters of aromatic polycarboxylic acids with polyfunctional alcohols; polyamides; the condensation products of formaldehyde with phenols, the so-called phenoplasts, and the condensation products of formaldehyde with urea, thiourea and melamine, the so-called aminoplasts; the polyesters used as lacquer resins, namely, both saturated resins, for example alkyd resins, and unsaturated resins, for example maleic resins; and also the polyaddition or polycondensation products of epichlorohydrin with polyols or polyphenols, known under the name of "epoxide resins"; also the so-called thermoplasts, that is, the non-curable polyplasts. It is emphasised that it is possible to pigment according to the invention not only the homogeneous compounds but also mixtures of polyplasts, as well as co-condensates and co-polymers, for example those based on butadiene.

The pigments according to the invention are especially suitable for dyeing polyplasts, such as so-called film formers or binders, known as raw materials for lacquers, particularly for dyeing linseed oil varnish, nitrocellulose, alkyd resins, melamine resins and urea-formaldehyde resins. The pigmenting of the high-molecular organic materials with the pigments of the formula I is performed for example by mixing a pigment of this type, optionally in the form of master batches, with the said substrates by means of roll mills or mixing and grinding apparatus. The pigmented material is subsequently processed into the desired final form by methods known per se, such as by calendering, moulding, extrusion, brushing, casting or injection moulding. It is often advantageous, for producing non-rigid shaped articles or for reducing the brittleness of the products obtained, to incorporate into the high-molecular materials, before the shaping operation, so-called plasticisers. These can be for example esters of phosphoric acid, phthalic acid or sebacic acid. The plasticizers can be worked into the polyplasts before or after incorporation of the pigment dye. It is also possible, for the purpose of obtaining various shades of colour, to add to the high-molecular organic materials, in addition to the compounds of the formula I, also fillers, or other colour-imparting constituents, such as white, coloured or black pigments, in any required amounts.

For pigmenting lacquers and printing pastes, the high-molecular organic materials and the compounds of the formula I, optionally together with additives, such as fillers, other pigments, siccatives or plasticizers, are finely dispersed or dissolved in a common organic solvent or solvent mixture. It is also possible to firstly disperse or dissolve the individual constituents each on its own or several jointly, and to subsequently combine all the components.

The pigmented, high-molecular, organic materials contain in general amounts of 0.001 to 30 percent by weight of a compound of the formula I, relative to the amount of high-molecular organic material to be pigmented: polyplasts and lacquers preferably contain 0.1 to 5 percent by weight, and printing pastes preferably 10 to 30 percent by weight, of a compound of the formula I. The amount of pigment is primarily governed by the colouring strength desired, secondly by the layer thickness of the shaped article, and finally also optionally by the content of white pigment in the polyplast.

The pigments according to the invention are distinguished by easy availability, by good fastness to heat, light, cross-lacquering, migration and weather, and by high purity of shade and colouring strength.

Except where otherwise stated in the Examples which follow, 'parts' are part by weight, percentages are percent by weight, and temperature values are in degrees Centigrade.

EXAMPLE 1

6.5 parts of 5-amino-6-methyl-benzimidazolone are dissolved in 170 parts by volume of glacial acetic acid at 60°. The brown solution is stirred up with 11 parts by volume of concentrated hydrochloric acid; the solution becomes somewhat lighter, and is then diluted with 35 parts of water and cooled to 5°. 10.8 parts by volume of 4 N sodium nitrite solution are subsequently added dropwise at 5° in the course of 20 minutes, and the olivegreen diazo solution obtained is filtered until clear.

11.2 parts of 2-acetoacetylamino-6-ethoxy-benzothiazole with 30 parts by volume of 30% sodium hydroxide solution are then dissolved in a mixture of 200 parts of water and 200 parts by volume of alcohol. The yellow solution is filtered and cooled to 5°, and the diazo solution described above is added dropwise within 20 minutes, in the course of which a brown precipitate is formed. The pH-value of the suspension obtained is adjusted to 5 by the slow addition of 95 parts by volume of 30% aqueous sodium hydroxide solution. The suspension is stirred for 4 hours as the temperature rises to 23°; the suspension is heated to 75° in the course of one hour, and is then filtered hot with suction. The residue is washed free from salt and then dried in vacuo at 80°. The yield is 16.5 parts (corresponding to 92% of theory) of a dark brown powder of the formula

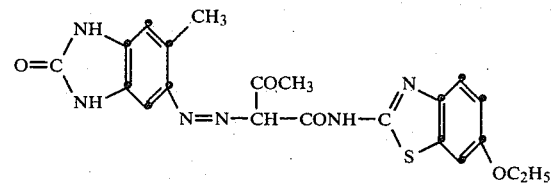

The pigment aftertreated in N-methyl-pyrrolidone (1 hour at 156°) produces in polyvinyl chloride fast, pure orange dyeings.

| Analysis: | | | | | | | | |
|---|---|---|---|---|---|---|---|---|
| calculated: | C | 55.74 | H | 4.65 | N | 18.57 | S | 7.09% |
| found: | C | 55.7 | H | 4.6 | N | 18.7 | S | 7.1%. |

There are described in the following Table further pigments according to the invention, which are produced by coupling of the diazotised bases listed in column I with the acetoacetic arylides of the amines shown in column II. Column III gives the shade of colour of a PVC sheet dyed with 0.2% of these pigments.

TABLE

| Ex. No. | I | II | III |
|---|---|---|---|
| 2 | 5-amino-6-chloro-benzimidazolone | 2-amino-6-ethoxy-benzothiazole | orange |
| 3 | 6-amino-7-chloro-4-methylquinol-2-one | 2-amino-6-ethoxy-benzothiazole | yellow |
| 4 | 4-amino-phthalimide | 2-amino-6-ethoxy-benzothiazole | yellow |
| 5 | 5-amino-7-chloro-benzimidazolone | 2-amino-6-ethoxy-benzothiazole | orange |
| 6 | 5-amino-6-methyl-benzimidazolone | 2-amino-6-methoxy-benzothiazole | red |
| 7 | 6-amino-7-chloro-4-methylquinol-2-one | 2-amino-6-methoxy-benzothiazole | brown |
| 8 | 4-amino-phthalimide | 2-amino-6-methoxy-benzothiazole | yellow |
| 9 | 5-amino-6-chloro-benzimidazolone | 2-amino-6-methyl-benzothiazole | yellow |
| 10 | 5-amino-6-methyl-benzimidazolone | 2-amino-6-methyl-benzothiazole | orange |
| 11 | 5-amino-6-methoxy-benzimidazolone | 2-amino-6-methyl-benzothiazole | red |
| 12 | 5-amino-6-chloro-benzimidazolone | 2-amino-6-chloro-benzothiazole | orange |
| 13 | 5-amino-6-methyl-benzimidazolone | 2-amino-6-chloro-benzothiazole | reddish-orange |
| 14 | 5-amino-6-methoxy-benzimidazolone | 2-amino-6-chloro-benzothiazole | red |
| 15 | 6-amino-7-chloro-4-methylquinol-2-one | 2-amino-6-chloro-benzothiazole | yellow |
| 16 | 7-amino-6-phenoxy-4-methylquinol-2-one | 2-amino-6-chloro-benzothiazole | yellow |
| 17 | 5-amino-6-methyl-benzimidazolone | 2-amino-6-acetamino-benzothiazole | reddish-orange |
| 18 | 5-amino-6-chloro-benzimidazolone | 2-amino-6-acetamino-benzothiazole | orange |

TABLE-continued

| Ex. No. | I | II | III |
|---|---|---|---|
| 19 | 7-amino-6-phenoxy-4-methylquinol-2-one | 2-amino-6-acetamino-benzothiazole | orange |
| 20 | 7-amino-6-methyl-phenylmorphol-3-one | 2-amino-6-acetamino-benzothiazole | orange |
| 21 | 5-amino-7-chloro-benzimidazolone | 2-amino-6-acetamino-benzothiazole | yellow |
| 22 | 6-amino-7-chloro-4-methylquinol-2-one | 2-amino-6-benzothiazolecarboxylic amide | greenish-yellow |
| 23 | 5-amino-6-methyl-benzimidazolone | 2-amino-5-chloro-6-methyl-4-methoxy-benzothiazole | red |
| 24 | 6-amino-7-chloro-4-methylquinol-2-one | 2-amino-4,6,7-trimethyl-benzothiazole | yellow |
| 25 | 5-amino-6-methyl-benzimidazolone | 2-amino-4,6-dichloro-benzothiazole | orange-red |
| 26 | 6-amino-7-chloro-4-methylquinol-2-one | 2-amino-4,6-dichloro-benzothiazole | yellow |
| 27 | 6-amino-7-chloro-4-methylquinol-2-one | 2-amino-6-benzothiazole-ethylcarboxylate | greenish-yellow |
| 28 | 5-amino-6-methyl-benzimidazolone | 2-amino-6-n-butyloxy-benzothiazole | orange |
| 29 | 5-amino-6-methyl-benzimidazolone | 2-amino-6-nitro-benzothiazole | scarlet |
| 30 | 6-amino-7-chloro-4-methylquinol-2-one | 2-amino-6-phenoxy-benzothiazole | orange |
| 31 | 6-amino-7-chloro-4-methylquinol-2-one | 2-amino-5,6-dimethyl-benzothiazole | yellow |
| 32 | 6-amino-7-chloro-4-methylquinol-2-one | 2-amino-6-fluoro-benzothiazole | yellow |

The 2-acetoacetylamino-6-chlorobenzothiazole for Example 12 can be produced in the following manner: 73.9 parts of 2-amino-6-chlorobenzothiazole in 110 parts by volume of glacial acetic acid are heated to 55°, and to the thin white suspension are added dropwise within 15 minutes 41 parts of diketene, in the course of which the temperature rises to 110°, with a very thick suspension being formed at 70°. This is diluted with 100 parts by volume of glacial acetic acid, and the suspension is then stirred for 2 hours at 80°; it is allowed to cool to 65° and is subsequently diluted with 300 parts of distilled water. The thick light-beige suspension is stirred for 2 hours at a temperature falling to 26°, and is afterwards filtered with suction. The product is washed with 1500 parts of water and dried at 70° in vacuo. The yield after drying is 93.5 parts (87% of theory) of a light-beige powder having a melting point of 248°–250°.

| Analysis: | | | | | | | | | | |
|---|---|---|---|---|---|---|---|---|---|---|
| calculated: | C | 49.17 | H | 3.38 | Cl | 13.19 | N | 10.43 | S | 11.93% |
| found: | C | 49.1 | H | 3.4 | Cl | 13.4 | N | 10.4 | S | 11.9%. |

EXAMPLE 33

67 g of polyvinyl chloride powder (suspension polymer), 33 g of dioctyl phthalate, 2 g of dibutyltin dilaurate, 0.3 g of a stabiliser based on phosphate, and 0.7 g of the pigment produced according to Example 1 are mixed together, and the mixture is processed in the mixing rolls at 160° for 15 minutes. A sheet having a thickness of 0.4 mm is subsequently produced on the calender rolls. The sheet has been dyed in a pure orange shade, and the dyeing is fast to light, weather and migration.

EXAMPLE 34

0.2 g of the pigment produced according to Example 1 and 100 g of polystyrene granulate are mixed together and the mixture is processed on mixing rolls at 130° until the dyeing appears homogeneous. The mixture is then pressed between chromium-plated platens at 150° into the form of sheets, and the orange dyeing of the sheets has good fastness to light. The pigmenting can also be carried out in an extruder instead of on the mixing rolls. It is also possible to granulate the homogeneously pigmented mixture and to shape the material in the injection-moulding machine.

EXAMPLE 35

0.2 g of the pigment produced according to Example 1, 1 g of titanium dioxide (Rutil) and 100 g of polyethylene granulate are mixed in a drum, and the mixture is then processed on the mixing rolls at 130°. The mixture is pressed hot into the form of sheets or is moulded in an extruder. The sheets display a beautiful orange shade having excellent fastness to light.

EXAMPLE 36

0.1 g of the pigment produced according to Example 1, 0.5 g of titanium oxide (Rutil) and 100 g of polypropylene granulate are mixed in a drum, and the mixture is then processed on mixing rolls at 130° until a homogeneously dyed mixture is obtained. This is subsequently pressed hot into the form of 1 mm thick hides having a beautiful orange shade which has good fastness to light.

EXAMPLE 37

100 g of a pulverulent formaldehyde-urea resin suitable for moulding compounds, 10 g of lithopone and 1 g of the pigment produced according to Example 1 are ground in a ball mill for 16 hours, and the mixture is subsequently shaped in moulds at 140°–160°. The resulting orange specimens have good fastness to light and to heat.

EXAMPLE 38

24.5 g of an unesterified epoxide resin, 10.5 g of an oil-reactive alkylphenol resin, 35 g of xylene and 30 g of diacetone alcohol are processed into the form of a lacquer, and this is then ground with 4 g of the pigment produced according to Example 1 for 24 hours in a ball mill. The orange coatings obtained after spraying the lacquer onto aluminium sheets and stoving at 120° have very good fastness to heat, cross-lacquering and light.

EXAMPLE 39

4 parts of the finely divided pigment according to Example 1 are stirred into 20 parts of a solvent of the following composition: 50 parts of Solvesso 150® (mixture of aromatic hydrocarbons), 15 parts of butyl acetate, 5 parts of Exkin II® (levelling agent based on ketoxime), 25 parts of methyl-isobutyl ketone and 5 parts of silicone oil (1% in Solvesso 150). After a complete fine dispersion is obtained (in about 15–60 minutes depending on the type of stirrer), the binders are added, namely, 48.3 parts of Baycryl L 530® (acrylic resin) (51% in xylene/butanol 3:1) and 23.7 parts of Maprenal TTX® (melamine resin; 55% in butanol). After a brief homogenization, the lacquer is applied by customary methods, such as by spraying and dip-coating or, specially for the continuous coating of metal sheets, by the "coil-coating" process, and subsequently stoved (stoving for 30 min., 130° C.). The orange lacquerings obtained are distinguished by very good levelling, high gloss and excellent fine dispersion of the pigment, as well as by excellent fastness to weather.

EXAMPLE 40

4 g of the pigment obtained according to Example 1, 35 g of a 60% solution of an alkyd resin (modified with urea-formaldehyde) in xylene/butanol 1:1, 10 g of oil of turpentine and 5 g of xylene are ground for 48 hours in a ball mill. The orange coating obtained after the dyed lacquer formed has been sprayed onto an aluminium sheet and stoved at 120° has very good fastness to light, heat and cross-lacquering.

EXAMPLE 41

80 g of an unsaturated liquid polyester resin, 19.72 g of monostyrene and 0.28 g of a cobalt siccative containing 16% of cobalt are ground with 1 g of the pigment obtained according to Example 1 and 5 g of titanium dioxide (Rutil) for 48 hours in a ball mill. Shortly before application of this lacquer, there is added a mixture consisting of 4.15 g of 70% cumene hydroperoxide, 2.52 g of ethyl acetate and 13.33 g of butyl acetate. This mixture is applied to card-board and dried in air to obtain an orange-coloured coating having very good fastness to light, to heat and to cross-lacquering.

What is claimed is:

1. A compound of the formula I

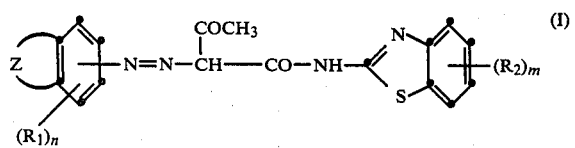

wherein $R_1$ is hydrogen, methyl, chlorine, methoxy, ethoxy, phenoxy or $C_2$-$C_5$-alkoxycarbonyl, $R_2$ is methyl, chlorine, fluorine, bromine, $C_1$-$C_4$-alkoxy, phenoxy, methoxycarbonyl, ethoxycarbonyl, carbamoyl, nitro or a group —NHCO—$R_3$, in which $R_3$ is a $C_1$-$C_3$-alkyl group, Z together with the two carbon atoms to whih it is bound forms a 5- or 6-membered heterocyclic ring, where Z is a bivalent radical of the formula —CONHCO—, —CONHCONH—, —CONHCR$_5$=N—, —NHCONR$_4$—, —NHCOCONH—, —NR$_4$COO—, —NR$_4$COS—, —N=CR$_6$O—, —N=CR$_6$S—, —N=CR$_6$NH—, —NHCOCH=CR$_4$— or —NHCOCH$_2$O—, in which R$_4$ is hydrogen, $C_1$-$C_4$-alkyl or phenyl which is unsubstituted or substituted by halogen, $C_1$-$C_4$-alkyl or $C_1$-$C_4$-alkoxy, $R_5$ is hydrogen or a group

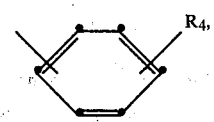

where $R_4$ has the meaning defined above, and $R_6$ is hydrogen, methyl or phenyl, n is 1 or 2, and m is 1, 2 or 3.

2. A compound according to claim 1 of the formula I wherein m and n are each 1.

3. A compound according to claim 1 of the formula I wherein $R_1$ and $R_2$ have the meanings given in claim 1, and Z is a group —NHCOCH=CR$_4$—, with R$_4$ being hydrogen or methyl, or Z is a group —CONHCO— or a group —NHCONR$_4$—, where R$_4$ has the meaning defined in claim 1.

4. A compound according to claim 3, wherein Z is a group —NHCONH—.

5. A compound according to claim 1, of the formula II

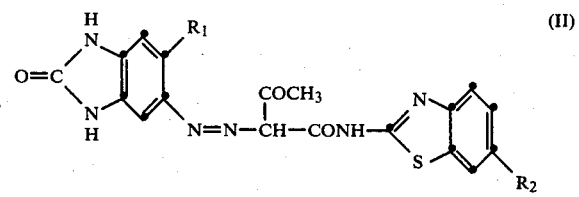

wherein $R_1$ is methyl, chlorine or methoxy, and $R_2$ is methyl, chlorine, straight-chain $C_1$-$C_4$-alkoxy or a group —NHCO—$R_3$, where $R_3$ is a $C_1$-$C_3$-alkyl group.

6. A compound according to claim 1 of the formula

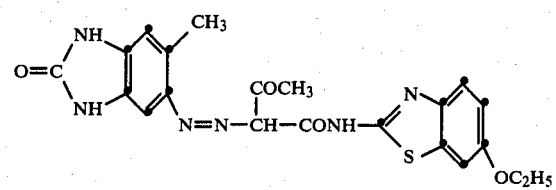

7. A compound according to claim 1 of the formula

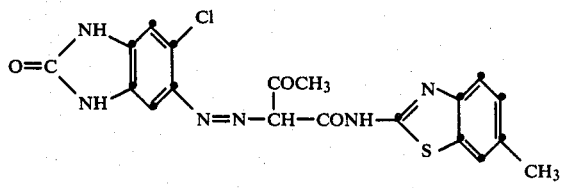

8. A compound according to claim 1 of the formula

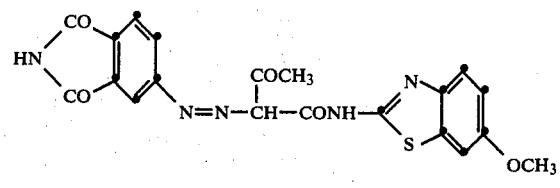

9. A compound according to claim 1 of the formula
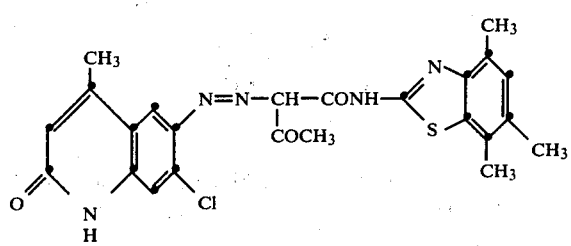
10. A compound according to claim 1 of the formula
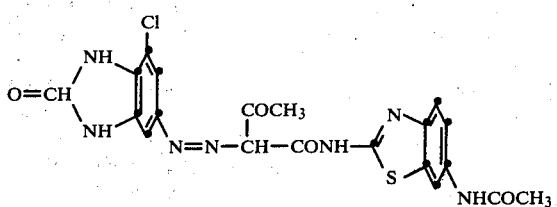
* * * * *